United States Patent
Bergius et al.

[11] 3,749,034
[45] July 31, 1973

[54] PLANTING TOOL FOR SEEDLINGS

[76] Inventors: Mikko Hannu Tapani Bergius, Lansi-Sakyla; Tapio Heikki Saarenketo, Ilvespolku 20, 96400 Rovaniemi 40; Altti Kalervo Keskilohko, Lansi-Sakyla, all of Finland

[22] Filed: Mar. 8, 1972

[21] Appl. No.: 232,847

[30] Foreign Application Priority Data
Mar. 11, 1971 Finland.......................706/71

[52] U.S. Cl. .................................. 111/4, 111/92
[51] Int. Cl. ........................................ A01c 11/00
[58] Field of Search ................. 111/4, 92, 99, 98; 47/37

[56] References Cited
UNITED STATES PATENTS

| | | | |
|---|---|---|---|
| 3,150,620 | 9/1964 | Popplewell | 111/4 |
| 2,014,311 | 9/1935 | Council | 111/4 X |
| 2,171,067 | 8/1939 | Masters | 111/4 |
| 2,891,813 | 6/1959 | Inaki | 111/4 UX |

Primary Examiner—Robert E. Pulfrey
Assistant Examiner—Stephen C. Pellegrino
Attorney—Sandoe, Hopgood & Calimafde

[57] ABSTRACT

A planting tool for seedlings consisting of a shaft in the form of a pipe, having a handle at the upper end thereof, and a pair of blades at the lower end, in the nature of jaws, one of the jaws being fixed and the others being pivotally mounted, and having a foot pedal affixed thereto. A lever is associated with the pipe, with handle means at its upper end, near the handle at the top of the pipe, whereby seeds may be selectively planted in the ground at a predetermined depth, through coordinated manipulation of the pivotably jaw, and the seed lever.

3 Claims, 3 Drawing Figures

PATENTED JUL 3 1 1973  3,749,034
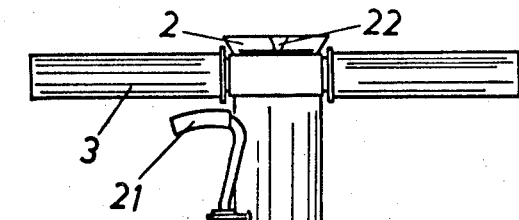
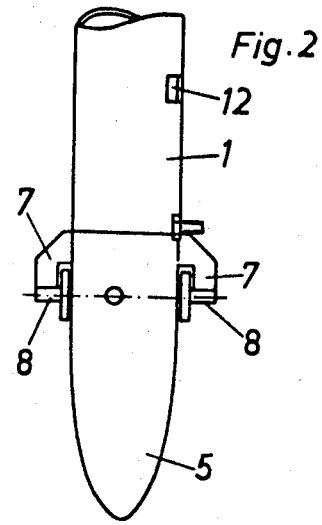
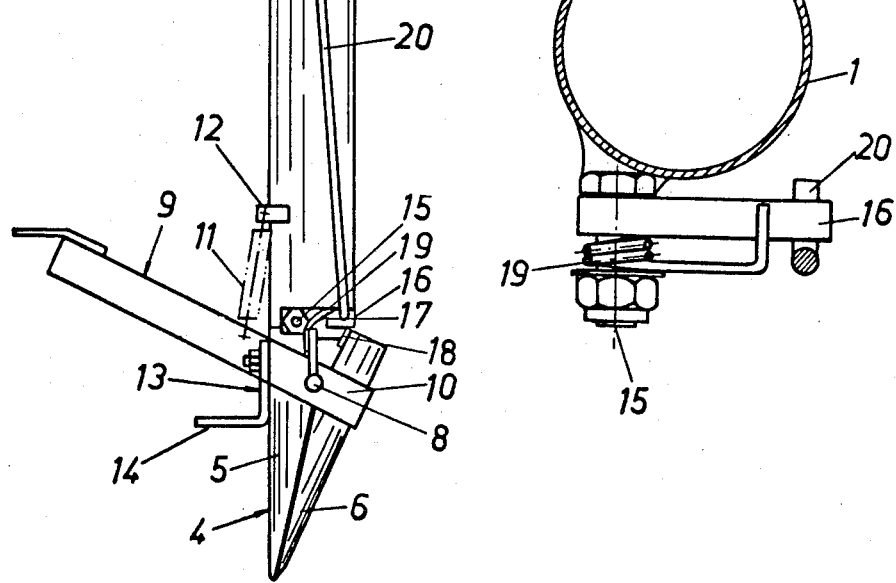

PLANTING TOOL FOR SEEDLINGS

BACKGROUND OF THE INVENTION

The object of this invention is a planting tool for seedlings comprising a shaft forming pipe with a handle at the upper end of the pipe and a blade at its lower end for making a planting hole in the ground, which blade consists of a fixed jaw extending from the lower end of the pipe, and a moveable jaw pivotally mounted to this jaw, which is connected to an operating means for opening the latter after pushing the blade into the ground.

Tools of the above-mentioned type intended for sowing seeds are known its true, where the pipe forming the shaft is made to a seed container which is filled with seeds through an opening in the side of the upper part of the pipe to be closed by a cover. The upper part of the pipe is closed by the handle, and the lower part by a bottom provided with a hole to be closed and opened by a slide connected with the upper end of the turning jaw. Likewise the slide is provided with a hole which when the jaws are closed is closed by a guide plate below the slide. When the pivoting jaw is closed the mentioned holes are opposite one another, so that seeds from the pipe are able to fill the hole in the slide. From the last-mentioned hole the seeds fall out after the hole is made in the ground by pushing the jaws in closed position into the ground and thereafter opening the pivoting jaw. For turning this to open position a lever is connected to a lug fixed to the lower end of the pipe, one branch of which is resting against the upper end of the pivoting jaw, while the lower end of a string or a metal wire is connected to its other branch. The upper end of the wire is connected to a hand lever, the other end of which is pivotally mounted to that arm of the hand lever, which closes the upper end of the pipe. When the blade made up of the two jaws is pressed into the ground with the hand on the handle, the hand lever is grasped by the fingers and pressed against this handle, where the hand lever turns the knee lever by way of the string or the metal wire. Now the other branch of the knee lever is turning the pivoting jaw to open position, while widening the hole made in the ground. At the same time, the slide connected to the pivoting jaw is moving towards the fixed jaw and the hole in it is passing the guide plate, so that the seeds in the hole are falling into the hole in the ground.

However, the device described above has many disadvantages. For instance, in order to open the pivoting jaw a great force applied by the hand is necessary, especially when the blade is pressed into hard ground. Neither is a device like this suited for planting root cake seedlings or seedlings reared in paper pots.

SUMMARY OF THE INVENTION

The aim of this invention is to eliminate the above presented disadvantages, which is accomplished by the device according to the invention, mainly characterized in that a pedal mounted to the fixed jaw serving as operating means is fixed to the pivoting jaw, that the upper end of the pipe is provided with a funnel for fitting the seedling into the pipe for conducting it between the open jaws in the planting hole through its open lower end, and that it is provided with a bolt and trigger mechanism to keep the pivoting jaw in an open position, and to release it to closed position.

The planting tool according to the invention offers many marked advantages compared to previously known planting tools of corresponding type. Because opening of the pivoting jaw is done by stepping by the foot on the pedal, this jaw can easily be brought to open position when the blade is pressed into very hard ground. It is also convenient by means of the notch with sharpened edges, made in the upper rim of the feeding funnel for seedlings at the upper end of the pipe, to cut possible excess seedlings in the detached root cake from their growing base, which fits well into the pipe and easily slides through, so that only one seedling is left in each root cake to be planted. By this means the thinning work in connection with the seedlings to be planted, which otherwise would have to be carried out during the period of growth is entirely avoided. In addition the pivoting jaw, because of the bolt and trigger mechanism, remains in an open position after stepping on the pedal, and closes automatically due to the power of the tension spring placed between the pedal and the pipe after the blade is lifted out from the planting hole and the bolt is released by pulling the hook-like upper end of the trigger pole toward the handle by the finger.

BRIEF DESCRIPTION OF THE INVENTION

The invention is described further below and in the enclosed drawing, in which;

FIG. 1 presents from the side a planting tool according to the invention,

FIG. 2 presents from the front of the lower ends of the jaw and the fixed jaw on a larger scale, and FIG. 3 presents on a still larger scale, a partial top section of the bolting and trigger device of the pivoting jaw at the lower end of the shaft.

DESCRIPTION OF THE PREFERRED EMBODIMENTS

According to the drawing the planting tool for seedlings according to the invention includes a shaft consisting of a pipe 1 open at both ends. The upper end of it is provided with a centrally located funnel 2 and a transversal handle 3, while its lower end is provided with a blade 4 for making the planting hole in the ground. The blade 4 consists of two jaws 5 and 6 curved in cross-section, with a bending radius essentialy equalling the radius of the pipe 1. The upper part of both jaws has a semi-cylindrical shape, the jaw thereafter being bevelled downwards like a wedge, so that when the jaws are closed the bevelled surfaces are opposite each other to form a blade of the shape of an equilateral wedge.

As the FIGS. 1 and 2 reveal, one jaw 5 is fixed by its upper end as an extension concentrically from the lower end of the pipe 1. From the edges of the upper end of this jaw 5 projections 7 extend sideways with pivots 8 fixed to them for pivotable mounting of the other jaw 6. Therefore, one of the clamp-like ends of the pedal 9 is welded as operating means for the turning jaw to the exterior surface of the upper part of the jaw 6, the branches 10 of which are pivotable mounted to the mentioned pivots, between the actual jaw and its projections. In addition, one end of a spring 11 is connected to the pedal 9, while the other end is connected to a projection 12 fixed on the pipe, which spring is striving to draw the free end of the pedal upwards and in this way to press the pivoting jaw 6 against the fixed jaw 5 to the position shown in FIG. 1. Furthermore, one side of an angle-iron 13 is detachably fixed to the exterior surface of the fixed jaw 5, while its other side 14 stands out from the jaw. Holes are made into the first-mentioned side at a distance from one another, so that the location of the angle-iron in relation to the jaw 5 can be varied vertically. The pupose of this angle-iron is described below further. In order to lock the pivoting jaw 6 to open position, the planting tool is provided with a bolt and trigger device. As seen in FIG. 1, and in FIG. 3 in particular, this consists of a bolt 16, one end of which is turnably mounted to at a pivot point 15 and fixed to the side of the lower end of the pipe 1, and which is provided with a notch 17 in its lower surface for a counterpiece 18 fixed to the upper end of the turning jaw. A spiral spring 19 is fitted about the pivot point 15 of the bolt 16 with one end resting against the fixed jaw 5 and other end resting against the upper surface of the bolt 16, which spring is striving to turn the free end of the bolt downwards, at which when the jaws are closed the bolt is resting against the counter-piece 18 of the pivotable jaw, as seen in FIG. 1. When the pedal 9 is pressed downwards, the jaw 6 pivots to open position in the direction of the pipe 1, i.e. to a vertical position corresponding to the fixed jaw 5, where the upper parts of the jaws 5 and 6 form a cylinder. The jaw 6 turning to this position is locked by the counter-piece 18 entering the bolt notch 17 to stay there as the spiral spring 19 is pressing the bolt downwards, also after the pedal is free. In order to open the locking, the lower end of a trigger pole 20 is connected to the hole made into the free end of the bolt 16, the upper end of which pole bent to a hook 21, reaches near the handle 3. By holding the handle the trigger pole 20 can be drawn upwards from the hook 21 by the finger, so that the bolt 16 turns upwards and the counter-piece 18 of the turning jaw 6 is free from the bolt notch 17, upon which the jaw 6 closes against the fixed jaw 5 due to the spring 11.

In planting seedlings of wood, sugar beets etc. by the planting tool according to the invention, the seedlings including growing base or paper pot are preferably placed into a plant bag hanging from the shoulder of the planter. The planter presses the blade 4 of the planting tool into the earth with the jaws 5 and 6 closed holding it by the handle 3, i.e. with the pivoting jaw 6 in the position according to FIG. 1, at which the pipe 1 is kept in an essentially vertical position. Pressing the blade into the earth may be accomplished or may be aided by stepping on the protruding branch 14 of the angle-iron 13, which at the same time determines the depth of penetration of the jaws into the earth, which depth is adjustable by varying the position of the angle-iron in relation to the jaw. After this the planter steps on the free end of the pedal 9, so that the pivoting jaw 6 opens to become parallel with the pipe 1 and widens the planting hole, while remaining in open position due to the bolt 16. Then the planter takes a seedling from the plant bag and drops the root cake by way of the funnel 2 into the pipe 1, along which it slides into the planting hole through the gap between the jaws 5 and 6. In pulling the seedlings in the bag from the growing base a root cake remains, which can be made smaller by pulling it through a sharpened triangular hole 22 in the edge of the funnel 2. When the seedling has fallen into the planting hole, the planting tool is lifted up and the earth about the seedling is stamped tight. In order to plant the next seedling the pivoting jaw 6 is closed by pulling the trigger pole 20 upwards from the hook 21, and again the blade can be pressed into the ground.

A suitable length for the planting tool is found in tests to be about 95 cm, at which the planter does not have to bow at all in making the planting hole and placing the seedling into it. On this account considerably faster and easier planting is accomplished. The inside diameter of the pipe may be about 50 mm for the seedlings to glide and fall easily through the pipe.

The invention of course is not restricted to the above presented working examples alone, but it may be varied considerably within the scope of the invention as far as details are concerned. Thus, for example, both jaws may be turnably mounted in some suitable way to the lower end of the shaft, so that the jaws can be opened and locked to open position while being pressed into the ground.

We claim

1. A planting tool for seedlings consisting of a shaft, a handle at the upper end of the shaft, a blade at the lower end of the shaft for making a planting hole in the ground, the blade consisting of a fixed jaw extending from the lower end of the pipe, and a jaw pivotably mounted with respect to the fixed jaw, the upper end of the shaft being provided with a funnel for fitting the seedling into the shaft whereby they are conducted to the jaws and the planting hole, wherein the improvement comprises an operating means including a pedal attached to the fixed jaw and a bolt and trigger mechanism to keep the turning jaw in an open position and to release it to a closed position, said bolt and trigger mechanism including a bolt mounted to the lower end of the shaft, rotatable about a pivot point and provided with a notch in its lower surface, a counter piece fixed to the turning jaw which engages the notch, a spiral spring disposed around the pivot point of the bolt which rotates the bolt into engagement with the counter piece thus arresting the jaw in its opened position, the operating means further comprising a trigger pole with its lower end connected to the bolt and its upper end bent to form a hook fixed to the upper end near the handle of the shaft.

2. A planting tool according to claim 1, further comprising a tension spring connected at one end to the pedal and at its other end to the shaft which serves to pull the free end of the pedal upwardly to press the pivotable jaw against the fixed jaw.

3. A planting tool according to claim 1, further comprising a tension spring connected at one end to the pedal and its other end to the shaft which pulls the free end of the pedal upwardly to press the pivotable jaw against the fixed jaw.

* * * * *